(12) United States Patent
Ding

(10) Patent No.: US 9,601,250 B2
(45) Date of Patent: Mar. 21, 2017

(54) MAGNETIC CHUCK AND METHOD FOR PRODUCING A MAGNETIC CHUCK

(71) Applicant: SOPH INTERNATIONAL LIMITED, Road Town, Tortola (VG)

(72) Inventor: Hong Ding, Shanghai (CH)

(73) Assignee: SOPH INTERNATIONAL LIMITED, Tortola (VG)

( * ) Notice: Subject to any disclaimer, the term of this patent is extended or adjusted under 35 U.S.C. 154(b) by 0 days.

(21) Appl. No.: 14/669,383

(22) Filed: Mar. 26, 2015

(65) Prior Publication Data

US 2015/0279536 A1 Oct. 1, 2015

(30) Foreign Application Priority Data

Mar. 31, 2014 (EP) .................................. 14162626

(51) Int. Cl.
*H01F 7/02* (2006.01)
*B23Q 3/154* (2006.01)

(52) U.S. Cl.
CPC ......... *H01F 7/0252* (2013.01); *B23Q 3/1546* (2013.01); *Y10T 29/49075* (2015.01)

(58) Field of Classification Search
CPC .... H01F 7/022; H01F 7/0252; H01F 41/0246; B23Q 3/1546; Y10T 29/49075
See application file for complete search history.

(56) References Cited

U.S. PATENT DOCUMENTS

| | | | | |
|---|---|---|---|---|
| 3,389,357 A | * | 6/1968 | Schneider ............ | B23Q 3/1546 335/289 |
| 3,488,536 A | * | 1/1970 | Baermann ............ | B23Q 3/1546 310/105 |
| 4,075,589 A | * | 2/1978 | Braillon ............... | B23Q 3/1546 335/286 |
| 4,090,162 A | * | 5/1978 | Cardone .............. | B23Q 3/1546 335/289 |
| 4,507,635 A | * | 3/1985 | Cardone .............. | B23Q 3/1546 335/291 |

(Continued)

FOREIGN PATENT DOCUMENTS

| | | | | |
|---|---|---|---|---|
| CN | WO 2012100379 A1 | * | 8/2012 | .......... B23Q 3/1546 |
| WO | 2009130721 | | 10/2009 | |
| WO | 2012174858 | | 12/2012 | |

OTHER PUBLICATIONS

WO 2012174858 A1 google translation.*

*Primary Examiner* — Mohamad Musleh
(74) *Attorney, Agent, or Firm* — Price Heneveld LLP

(57) ABSTRACT

The invention is directed to a magnetic chuck and a method for producing a magnetic chuck. The magnetic chuck comprises an upper base made of a single piece of magnetic-conductive material and having a top surface, sidewalls extending orthogonally from the top surface, a cavity formed within the upper base with an open end opposite to the top surface and an opposite closed end directed toward the top surface. A plurality of cores extends orthogonally from the top surface and into the cavity, wherein a plurality of permanent magnets is arranged in the cavity. A reversible magnet is arranged between each of the cores and a lower base; and an excitation coil is arranged around the circumference of each reversible magnet. A portion of the cavity between the permanent magnets and the closed end of the cavity is filled with non-magnetic-conductive material.

17 Claims, 4 Drawing Sheets

(56) References Cited

U.S. PATENT DOCUMENTS

| | | | | |
|---|---|---|---|---|
| 4,847,582 A | * | 7/1989 | Cardone | B23Q 3/1546 335/289 |
| 7,940,149 B2 | * | 5/2011 | Lee | B23Q 3/1546 269/8 |
| 7,999,645 B2 | | 8/2011 | Sarda | |
| 8,031,038 B2 | * | 10/2011 | Kimura | B29C 45/1742 335/285 |

* cited by examiner

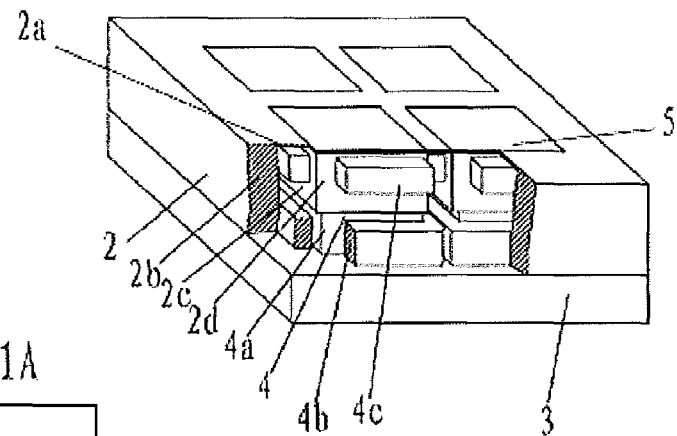
Fig. 1A  PRIOR ART
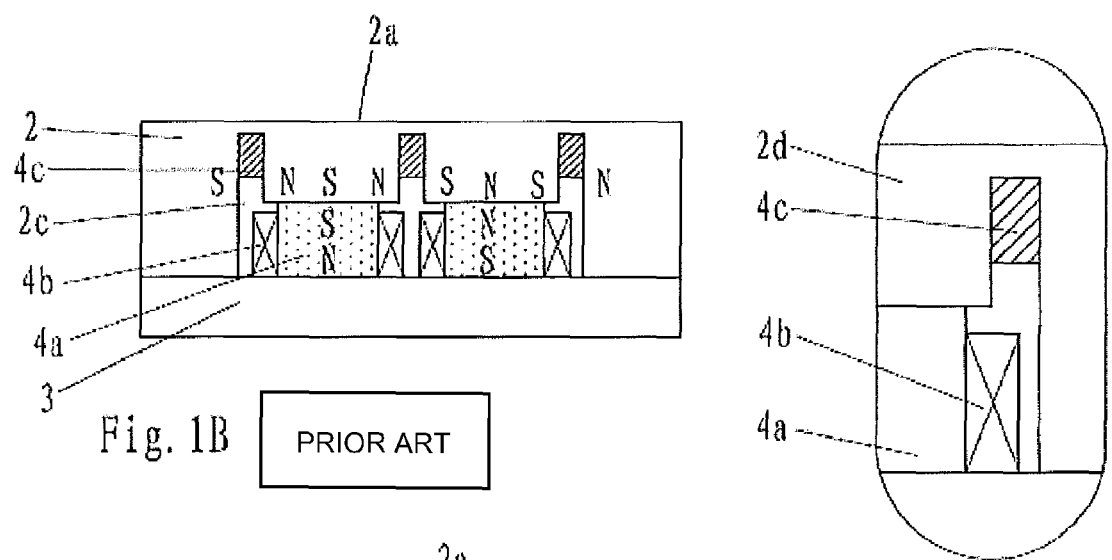
Fig. 1B  PRIOR ART
Fig. 1C  PRIOR ART
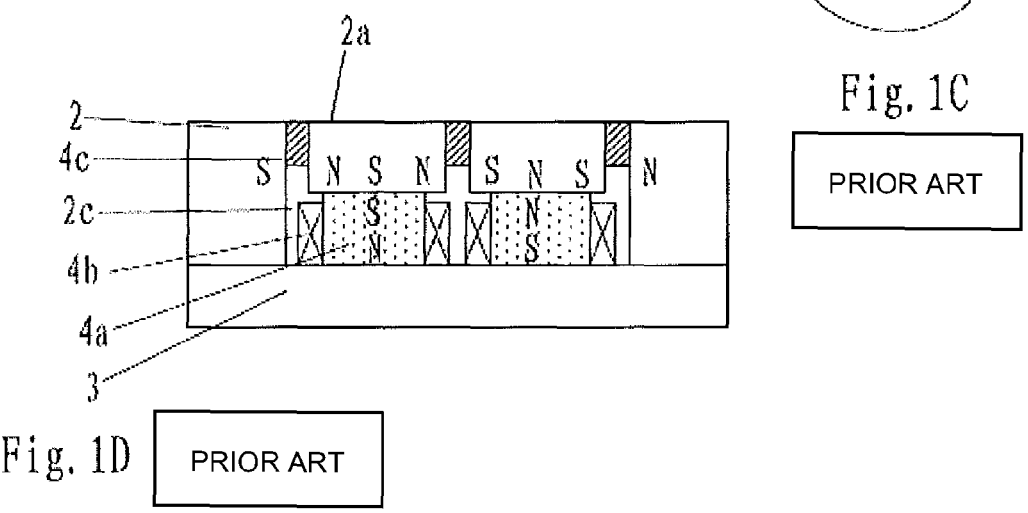
Fig. 1D  PRIOR ART

MAGNETIC CHUCK AND METHOD FOR PRODUCING A MAGNETIC CHUCK

CROSS-REFERENCE TO FOREIGN PRIORITY APPLICATION

The present application claims the benefit under 35 U.S.C. §119(b) of EP14162626, filed Mar. 31, 2014, entitled "Magnetic Chuck and Method for Producing a Magnetic Chuck," which disclosure is fully incorporated by reference.

FIELD OF THE INVENTION

The invention is directed to a magnetic chuck, in particular a leakage-type magnetic chuck and to a method of producing such a magnetic chuck.

A magnetic chuck is a magnetic apparatus for magnetic clamping of ferrous elements, for example work pieces which need to be fixed relative to a tool. Magnetic chucks and methods for producing magnetic chucks are known, for example, from WO 2012/174858 or EP 2 532 474 B1. In particular, magnetic chucks have been developed that have a continuous, monolithic surface on the side that is used for clamping a work piece. Such a continuous, monolithic surface has the advantage that no gaps between different materials are formed during temperature changes and thus the lifetime of magnetic chucks can be prolonged. However, further improvements to those chucks and methods for production are sought.

It is therefore an object of the present invention to provide for a magnetic chuck and a method for producing such a magnetic chuck which further improve existing solutions, in particular further prolong the lifespan of magnetic chucks.

SUMMARY OF THE INVENTION

According to a first aspect of the invention, this problem is solved by a magnetic chuck, comprising an upper base made of a single piece of magnetic-conductive material and having a top surface, sidewalls extending orthogonal from the top surface, a cavity formed within the upper base with an open end opposite to the top surface and an opposite closed end directed toward the top surface, and a plurality of cores extending orthogonally from the top surface and into the cavity, wherein a plurality of permanent magnets is arranged in the cavity; and wherein a reversible magnet is arranged between each of the cores and a lower base; and an excitation coil is arranged around the circumference of each reversible magnet; and wherein a portion of the cavity between the permanent magnets and the closed end of the cavity is filled with non-magnetic-conductive material.

The magnetic chuck according to the invention comprises a monolithic upper base with a top surface for clamping work pieces. The top surface is preferably continuous and may be even or have recesses, for example. Extending orthogonally from the edges of the top surface, which is preferably rectangular, are, preferably four, sidewalls. Further, between the inner surfaces of the sidewalls, a plurality of cores, i.e., two, three, or more cores, extend also orthogonally from the top surface. The cores, sidewalls, and top surface are integral with each other and made of the same single, monolithic piece of magnetic-conductive material. The extension of the sidewalls from the top surface in a direction orthogonal to the top surface is preferably equal to or larger than the extension of the cores in the same direction.

The plurality of cores is preferably distributed evenly in a plane parallel to the top surface, for example, four cores can be arranged into rows of two cores each. The cores preferably have a rectangular cross section in a plane parallel to the top surface and preferably are formed as cuboids. The iron cores can also have a circular shape in a plane parallel to the top surface. Between the inner surfaces of the sidewalls and between the cores is a cavity in the upper base. This cavity has an open end at a side of the upper base opposite to the top surface and a closed end, which is directed toward the top surface and preferably close to this top surface. The cavity may be in the form of several parallel slots extending orthogonal to several further parallel slots, wherein those slots separate the cores from each other and from the sidewalls.

Within the cavity, a plurality of permanent, or irreversible, magnets, i.e., two, three, or more permanent or irreversible magnets, is arranged. Preferably, permanent magnets such as NdFeB magnets can be used. These permanent magnets preferably are arranged such that in a plane parallel to the top surface, the permanent magnets are positioned between the cores or between a core and a sidewall, i.e., between pieces of the monolithic magnetic-conductive upper base. Preferably, an extension of the cores from the top surface in a direction orthogonal to the top surface is equal to or larger than a combined extension in the same direction of the portion of the cavity between the permanent magnets and the closed end of the cavity and the permanent magnets. This means that the permanent magnets are, along their extension in a direction orthogonal to the top surface, fully encompassed by cores and/or sidewalls of the monolithic upper base. Further, it is preferred that the permanent magnets are positioned such that two opposites sides of each of the permanent magnets are facing cores and/or sidewalls of the monolithic upper base. In particular, it is preferred that two opposites sides of each of the permanent magnets are directly adjacent to cores and/or sidewalls of the monolithic upper base, with only resin or some other non-magnetic-conductive filler material therebetween, at most.

It is particularly preferred that the permanent magnets are arranged around the circumference of each core. For example, if the cores are rectangular, it is preferred that one permanent magnet is set at each of the four sides of each core. Between two adjacent cores, one permanent magnet can be arranged which serves as the permanent magnet on the respective side of the two adjacent cores.

Between the cores and a lower base, which is also made of magnetic-conductive material and preferably monolithic, a plurality of reversible magnets, i.e., two, three, or more reversible magnets, are arranged. One reversible magnet is arranged between each core and the lower base or base plate. Preferably, the reversible magnets touch a surface of the cores parallel to the top surface.

Further, around the circumference of each of the reversible magnets an excitation coil is arranged.

It is preferred, that the permanent magnets are arranged closer to the top surface and thus the clamping surface than the reversible magnets, and preferably also closer to the top surface than the excitation coils. Preferably, the permanent magnets and the reversible magnets are arranged such that in different planes parallel to the top surface, only either the permanent magnets or the reversible magnets are present.

Among others, the invention is based on the finding that one important factor limiting the lifespan of magnetic chucks is the thickness of the upper base below the top surface, i.e., the thickness between the top surface and the closed end of the cavity. This thickness is limited, since the material between the top surface and the closed end of the cavity provides for a short circuit of the magnetic force of the permanent magnet and the larger this thickness is, the more magnetic force on the clamping surface will be lost. During the lifetime of a magnetic chuck, the top surface needs to be grinded in order to maintain the accuracy of the chuck. However, each time the top surface is grinded or damaged, the thickness of the upper base between the top surface and the closed end of the cavity is reduced, until eventually no material is left and the permanent magnets located in the cavity emerge at the top surface. In this state, however, the permanent magnets are exposed at the top surface and will oxidize and thus lose their magnetic force. Compared to these existing solutions and the related disadvantages, the inventive solution provides for a portion of the cavity between the permanent magnets and the closed end of the cavity close to the top surface which is filled with a non-magnetic conductive material, for example epoxy resin. This solution has the advantage that when the magnetic-conductive material of the upper base is reduced due to repeated grinding over the lifetime of the magnetic chuck, it is not the permanent magnets that will emerge at the top surface but the non-magnetic-conductive material. In this way, the permanent magnets are protected by the layer of the non-magnetic-conductive material, even if the magnetic-conductive material of the upper base between the top surface and the closed end of the cavity has been deleted.

In this stage the top surface will not be continuous anymore and the closed end of the cavity will become an open end. However, when reference is made to a continuous top surface of the monolithic upper base and/or to the closed end of the cavity close to the top surface, these terms and description refer to the state of the magnetic chuck at the beginning of its lifespan.

Further, the invention is based on the finding that in existing magnetic chucks, when permanent magnets are introduced into the cavity of the upper monolithic base during assembly, the permanent magnets will protrude fully towards the closed end of the cavity. The reason is that the magnetism of the permanent magnets will position the permanent magnets such that a short circuit through the magnetic-conductive material of the upper base between the closed end of the cavity and the top surface will occur, which is the case when the permanent magnets are protruding fully towards the closed end of the cavity. According to the invention, however, the permanent magnets are not positioned at the closed end of the cavity, but rather spaced from this closed end by a portion of the cavity filled with non-magnetic-conductive material.

Preferably, an extension of the upper base between the top surface and the closed end of the cavity in a direction orthogonal to the top surface is between 0.1 mm and 5 mm, in particular between 3 mm and 4 mm or between 1 mm and 2 mm. Such a thickness of the upper base between the top surface and the closed end of the cavity is preferred in order to optimize the magnetic power or the magnetic chuck.

Further, it is preferred that the portion of the cavity between the permanent magnets and the closed end of the cavity has an extension in a direction orthogonal to the top surface of about 1-15 mm, in particular of about 5-10 mm, and further in particular of about 6 mm. In particular, a minimum extension of the portion of the cavity between the permanent magnets and the closed end of the cavity in a direction orthogonal to the top surface is about 1, 2, 3, 4, 5, 6, 7, 8, 9, 10, 11, 12, 13, 14, or 15 mm. Further, it is preferred that the maximum extension of the portion of the cavity between the permanent magnets and the closed end of the cavity in a direction orthogonal to the top surface is about 15, 14, 13, 12, 11, 10, 9, 8, 7, 6, 5, 4, 3, 2, or 1 mm. The extension of the portion of the cavity between the permanent magnets and the closed end of the cavity that has been filled with a non-magnetic-conductive material is important: on the one hand this extension should be small enough to reduce negative influence on the magnetic power, and on the other hand this extension should be large enough to provide for enough room of protection even after a number of grinding cycles.

In a further preferred embodiment, the portion of the cavity between the permanent magnets and the closed end of the cavity has an extension in at least one direction parallel to the top surface, preferably a direction parallel to the top surface and parallel to at least one of the sidewalls, which is smaller than the extension of the permanent magnets in the same direction, preferably about less than 50% smaller.

In this embodiment, a portion of the cavity between the permanent magnets and the closed end of the cavity, which is filled with a non-magnetic-conductive material, has a smaller width than the permanent magnets in the same direction. This direction is a direction which is parallel to the top surface and preferably further parallel to at least one of the sidewalls. For example, the cavity can have a kind of step at which the width of the cavity is reduced from a width the cavity has between the step and its open end, from which the magnets are inserted into the cavity, to the width the cavity has between the step and its closed end. This portion with the reduced width is filled with non-magnetic-conductive material. This embodiment has the particular advantage that during the production process, the permanent magnets can be inserted into the cavity from the open end and will be stopped by the step or smaller width of the cavity such that the portion between the permanent magnets and the closed end of the cavity remains empty and can be filled by non-magnetic-conductive material, for example epoxy resin, afterwards. This non-magnetic-conductive material usually is injected through a hole in the base plate after assembly of the components of the magnetic chuck to fill out any remaining volume of the cavity. Usually, this non-magnetic-conductive material will pass between the permanent magnets to the closed end of the cavity to also fill the portion of the cavity between the permanent magnets and the closed end of the cavity.

It is particularly preferred that the portion of the cavity has a width that is 50% or less smaller than the width of the permanent magnet in the same direction. In particular, the width of the portion of the cavity is smaller than the width of the permanent magnet in the same direction preferably about less than 40%, 30%, 25%, 20%, 15%, 10%, or 5%. It is preferred that the step or reduction in width of the cavity on the one hand is large enough to stop the permanent magnets from further protruding into the cavity toward the closed end, and on the other hand is small enough to not inhibit the distribution of nonmagnetic-conductive material into the portion of the cavity between the permanent magnets and the closed end of the cavity after assembly of the magnetic chuck.

According to a further preferred embodiment, a spacer consisting of or comprising nonmagnetic-conductive material is arranged within the portion of the cavity between each permanent magnet and the closed end of the cavity.

Alternatively, or in addition to the previously described embodiments with respect to a reduction of the width of the cavity in a direction parallel to the top surface, a plurality of spacers, i.e., two, three, or more spacers, can be positioned in the portion of the cavity between each permanent magnet and the closed end of the cavity. Preferably, such spacers are introduced into the cavity before the permanent magnets are introduced into the cavity such that the permanent magnets can only protrude into the cavity until reaching the spacers. In this way, it also can be prevented that the permanent magnets are protruding all the way to the closed end of the cavity during assembly of the magnetic chuck. Preferably, the remaining portion of the cavity between the permanent magnets and the closed end of the cavity that is not filled up by the spacers, is filled with nonmagnetic-conductive material, such as epoxy resin.

It is particularly preferred that the spacers are made of pre-cured epoxy resin, in particular the same kind of resin that is used for filling the remaining parts of the cavity after assembly of the magnetic chuck. Alternatively, the spacers may be made of plastic, for example. It is further preferred that the spacer has an extension in a direction orthogonal to the top surface of about 1-15 mm, in particular of about 5-10 mm, and further in particular of about 6 mm. In particular, a minimum extension of the spacer in a direction orthogonal to the top surface is about 1, 2, 3, 4, 5, 6, 7, 8, 9, 10, 11, 12, 13, 14, or 15 mm. Further, it is preferred that the maximum extension of the spacer in a direction orthogonal to the top surface is about 15, 14, 13, 12, 11, 10, 9, 8, 7, 6, 5, 4, 3, 2, or 1 mm. Similar to the extension of the portion of the cavity between the permanent magnets and the closed end of the cavity, also the spacers have an according extension in order to provide an optimized extension to reduce negative influence on the magnetic power on the one hand and increase protection during repeated cycles of grinding on the other hand.

According to a further aspect of the invention, the above-mentioned problem is solved by a method for producing a magnetic chuck, preferably a magnetic chuck as described above, comprising: providing a single piece of magnetic-conductive material as an upper base with a top surface; forming a cavity with an open end opposite to the top surface and an opposite closed end directed toward the top surface into the upper base such that from a top surface, sidewalls extend orthogonal from the top surface, and a plurality of cores extend orthogonal from the top surface and into the cavity; arranging a plurality of permanent magnets in the cavity; arranging a reversible magnet between each of the cores and a lower base and arranging an excitation coil around the circumference of each reversible magnet; filling a portion of the cavity between the permanent magnets and the closed end of the cavity with non-magnetic-conductive material; and filling a remaining volume of the cavity with non-magnetic-conductive material.

Regarding the order or sequence of the steps it is important to note that the filling of a portion of the cavity between the permanent magnets and the closed end of the cavity with non-magnetic-conductive material may be carried out before or after the permanent magnets are placed into the cavity. Preferably, the remaining portion of the cavity is filled with non-magnetic-conductive material after the assembly of the further elements of the magnetic chuck. Further, the filling of a portion of the cavity between the permanent magnets and the closed end of the cavity with non-magnetic-conductive material may be carried out before, after, or together with the filling of a remaining volume of the cavity with non-magnetic-conductive material.

It is particularly preferred that the portion of the cavity between the permanent magnets and the closed end of the cavity is filled with non-magnetic-conductive material before the permanent magnets are placed into the cavity. It is further preferred that the non-magnetic-conductive material in the portion of the cavity between the permanent magnets and the closed end of the cavity is at least partly or fully cured before the permanent magnets are placed into the cavity. In this way, the partly or fully cured non-magnetic-conductive material will stop the permanent magnets from further protruding into the cavity during assembly.

Alternatively, or in addition, it is preferred that the cavity is formed such that the portion of the cavity between the permanent magnets and the closed end of the cavity has an extension in a direction parallel to the top surface, preferably a direction parallel to the top surface and parallel to at least one of the sidewalls, which is smaller than the extension of the permanent magnets in the same direction. In this embodiment, a cavity is formed with the portion of the cavity between the permanent magnets and the closed end of the cavity having a reduced width in a direction parallel to the top surface. Such a cavity can be formed preferably by forming a first cavity with a smaller width and, in a second step, widening this cavity to a greater width along a shorter extension from the open end of the cavity in a direction orthogonal to the top surface.

Further it is preferred that a spacer consisting of or comprising non-magnetic-conductive material is arranged within the portion of the cavity between the permanent magnets and the closed end of the cavity before the permanent magnets are placed into the cavity. Preferably, the spacers are introduced into the cavity before the permanent magnets are introduced. In this embodiment, the remaining portion of the cavity between the permanent magnets and the closed end of the cavity, that is not filled up by the spacers, can be filled with non-magnetic-conductive material also before the permanent magnets are placed into the cavity or after the assembly of the elements of the magnetic chuck. It is preferred to fill the remaining portion of the cavity between the permanent magnets and the closed end of the cavity together with the other remaining portions of the cavity at the end of the assembly, to only apply and possibly cure non-magnetic-conductive material in one production step.

As to the advantages, further preferred embodiments and further details of this aspect of the invention, reference is made to the corresponding aspects and embodiments described above.

BRIEF DESCRIPTION OF THE DRAWINGS

Preferred embodiments of the invention shall now be described with reference to the attached drawings, in which FIG. 1A: shows a partly cut, three-dimensional view of an existing magnetic chuck according to the prior art;

FIG. 1B: shows a cross section of the magnetic chuck according to FIG. 1A;

FIG. 1C: shows an enlarged detail of FIG. 1B;

FIG. 1D: shows a cross section of the magnetic chuck depicted in FIG. 1A after the magnetic chuck depicted in FIG. 1A has undergone a number of grinding cycles;

DETAILED DESCRIPTION OF THE PREFERRED EMBODIMENTS

Figure 2A:
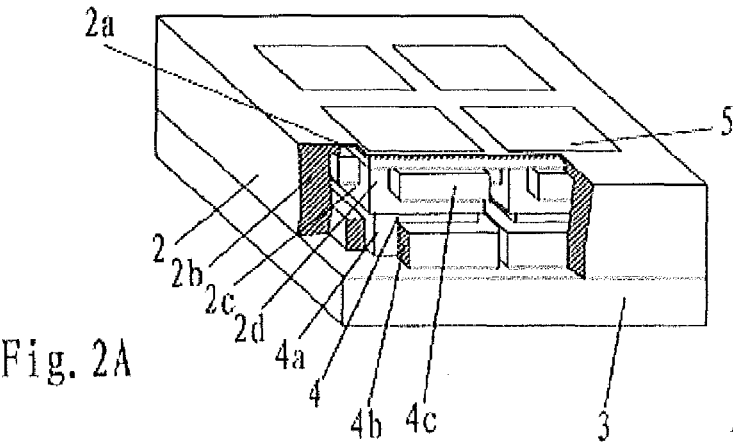
FIG. 2A: shows a partly cut, three-dimensional view of a first embodiment of a magnetic chuck according to the invention.
Figure 2B:
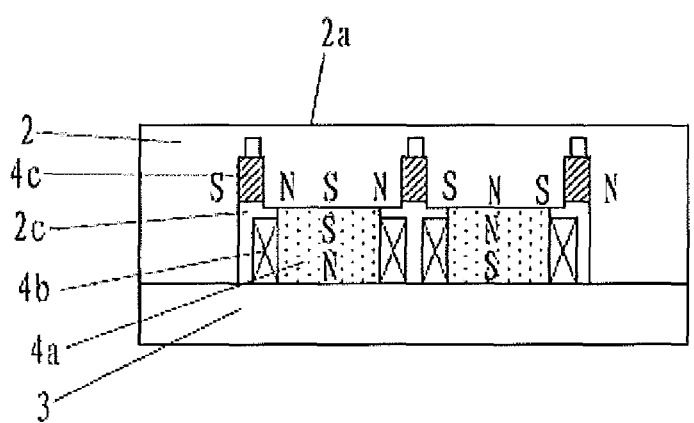
FIG. 2B: shows a cross section of the magnetic chuck according to FIG. 2A.
Figure 2C:
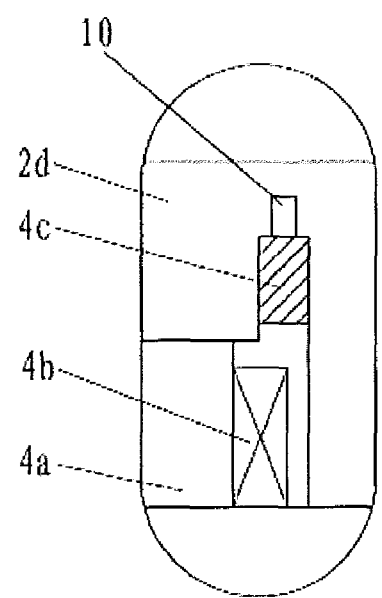
FIG. 2C: shows an enlarged detail of FIG. 2B.
Figure 2D:
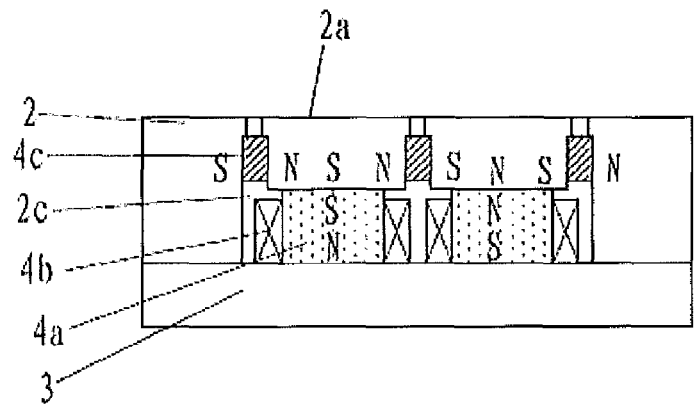
FIG. 2D: shows a cross section of the magnetic chuck depicted in FIG. 2A after the magnetic chuck depicted in FIG. 2A has undergone a number of grinding cycles.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1A-D show an existing magnetic chuck according to the prior art. In FIGS. 2A-D, FIGS. 3A-D, and FIGS. 4A-D, three examples of embodiments of magnetic chucks according to the invention are depicted. Elements with identical or similar function in the different drawings are referenced with the same reference numerals.

The existing magnetic chuck according to FIGS. 1A-D has an upper base 2 made of a single piece of magnetic-conductive material. Monolithic upper base 2 has a top surface 2a and four sidewalls 2b extending orthogonal from the edges of the top surface 2a. The cavity 2c is formed within the upper base 2 with an open end opposite to the top surface 2a and an opposite closed end directed toward the top surface 2a. A plurality of iron cores 2d extend orthogonal from the top surface 2a into the cavity 2c. The iron cores 2d are evenly distributed and arranged in a pattern of two rows of two iron cores 2d each. The upper base 2 is monolithic, i.e., the sidewalls 2b, the top surface 2a, and the cores 2d are integral with each other. Below the sidewalls 2b, a lower base 3, also made of a single piece of magnetic-conductive material, is provided.

The top surface 2a is rectangular and serves as a working surface to hold a work piece under processing. Preferably, an extension of the upper base 2 between the top surface 2a and the open end of the cavity 2c is about 0.1 mm-5 mm, in particular 0.1 mm, 2.5 mm or 5 mm. The areas 5 on the top surface 2a corresponding to the iron cores 2d form magnetic poles. Between the iron cores 2d and the lower base 3 a plurality of reversible magnets 4a is located. The reversible magnets 4a touch surfaces of the iron cores 2d opposite to the top surface 2a. An excitation coil 4b is set around the circumference of each reversible magnet 4a. Around the circumference of iron cores 2d, a plurality of irreversible, or permanent magnets 4c are arranged. Preferably, permanent magnets such as NdFeB magnets can be used. The iron cores 2d, permanent magnets 4c, reversible magnets 4a and excitation coils 4b form a plurality of magnetic modules 4.

Preferably, lower base 3, reversible magnets 4a, and iron cores 2d are connected together with screws. For example, on the bottom of each iron core 2d, threaded holes can be provided matching the screws, and on the lower base 3 and reversible magnets 4a, through-holes for the screws can be provided. A number of screws then can be threaded into the holes on the bottom of lower base 3, through lower base 3 and reversible magnets 4a, and tightened into iron cores 2d, thus fixing lower base 3, reversible magnets 4a, and iron cores 2d.

Further, a hole can be provided on lower base 3 for injection of non-magnetic conductive material into the cavity 2c in upper base 2. Materials such as epoxy resin can be chosen as the non-magnetic-conductive material to fix the elements of the magnetic chuck in the cavity 2c and also to function as sealing, insulation, and/or rigidity reinforcement.

As can be seen in FIG. 1B, the magnetic chuck is in an excitation state where no magnetism is produced externally and a work piece (not depicted) could be removed from the top surface 2a.

In FIG. 1D, the same magnetic chuck is shown after a number of grinding cycles, during which the top surface 2a has been grinded to remove or reduce scratches or other irregularities or deteriorations. As can be seen from FIG. 1D, the material of the upper base 2 between the formerly closed end of the cavity 2c and the top surface 2a has diminished and eventually disappeared, so that permanent magnets 4c are exposed at the top surface 2a. In this stage shown in FIG. 1D, the permanent magnets 4c are exposed to air, liquid, or debris on the top surface 2a and liquid or debris may enter into the gap between the permanent magnets 4c and the sidewalls 2b or the iron cores 2d.

The magnetic chuck according to the invention and as depicted in the three example embodiments of FIGS. 2A-D, 3A-D, and 4A-D avoid this disadvantage.

Three embodiments according to the invention shown in FIGS. 2A-D, 3A-D, and 4A-D differ from existing magnetic chucks, in particular as depicted in FIGS. 1A-D, in details with respect to the construction of the part of the magnetic chuck between the permanent magnets 4c and the top surface 2a.

The first example embodiment depicted in FIGS. 2A-D has a portion 10 of the cavity 2c between the permanent magnets 4c and the closed end of the cavity 2c that has an extension in at least one direction parallel to the top surface 2a, in particular a direction parallel to the top surface 2a and parallel to at least one of the sidewalls 2b, which is smaller than the extension of the permanent magnets in the same direction. As can be seen particularly in FIGS. 2B-D, the width of the portion 10 of the cavity 2c between the permanent magnets 4c and the closed end of the cavity is smaller than the width of the permanent magnets 4c, such that the permanent magnets 4c cannot protrude fully toward the closed end of the cavity but only until reaching the portion 10 of the cavity with the smaller width. In this way, the portion 10 of the cavity will also be filled with non-magnetic conductive material, in particular epoxy resin, when the remaining parts of the cavity 2c are filled. The epoxy resin will travel along the gaps between the different permanent magnets 4c into the portion 10 of the cavity 2c. In this way, when it comes to the state of the magnetic chuck shown in FIG. 2D after a number of grinding circles, even if the material of the upper base 2 between the top surface 2a and the closed end of the cavity 2c is gone, the permanent magnets 4c will not be exposed to the top surface 2a, but will be protected by the portion 10 of the cavity that is filled with the non-magnetic-conductive material.

Figure 3A:
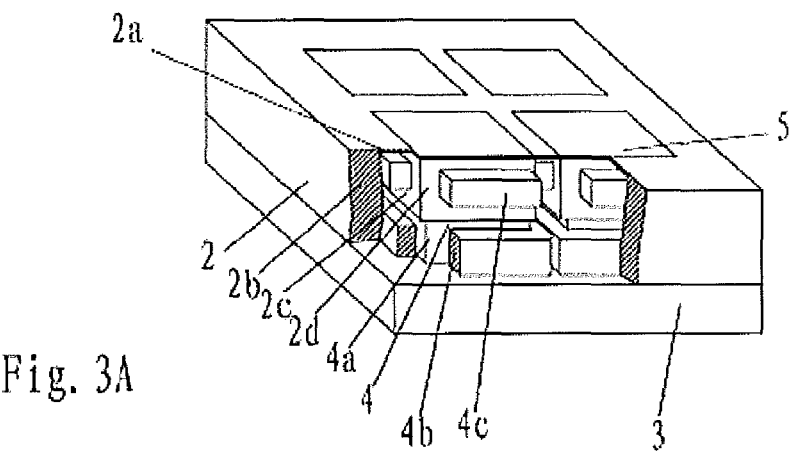
FIG. 3A: shows a partly cut three-dimensional view of a second embodiment of a magnetic chuck according to the invention.
Figure 3B:
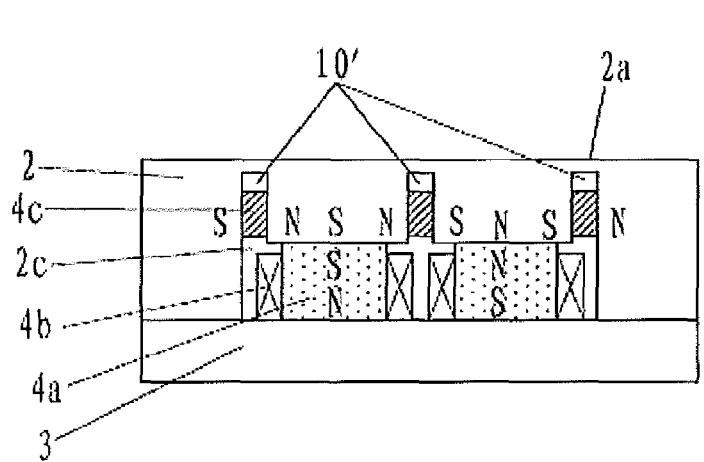
FIG. 3B: shows a cross section of the magnetic chuck according to FIG. 3A.
Figure 3C:
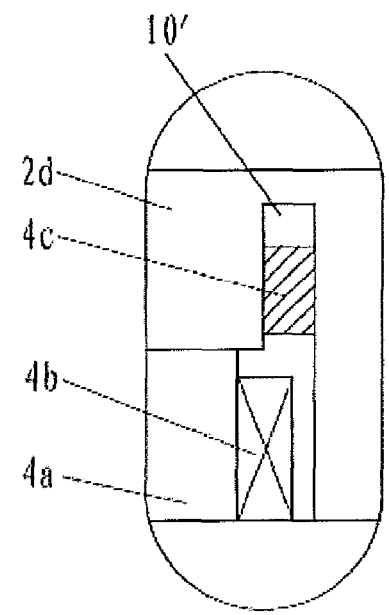
FIG. 3C: shows an enlarged detail of FIG. 3B.
Figure 3D:
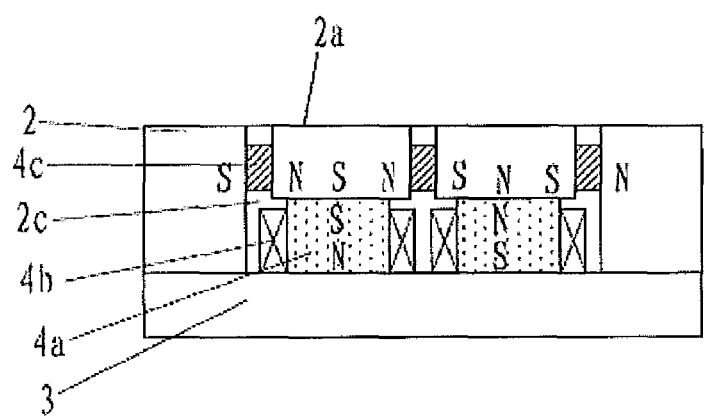
FIG. 3D: shows a cross section of the magnetic chuck depicted in FIG. 3A after the magnetic chuck depicted in FIG. 3A has undergone a number of grinding cycles.
Figure 4A:
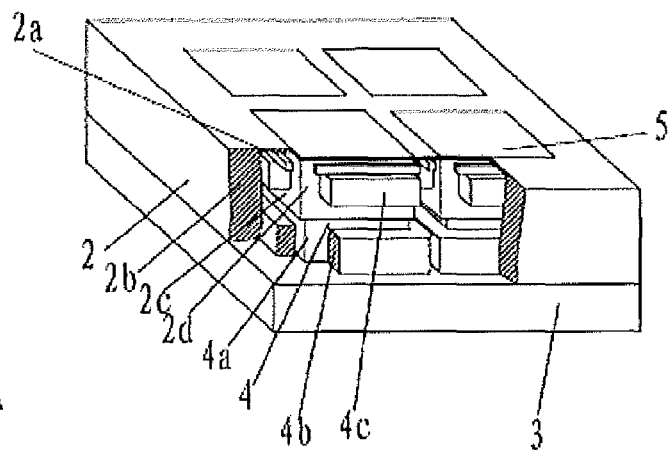
FIG. 4A: shows a partly cut, three-dimensional view of a third embodiment of a magnetic chuck according to the invention.
Figure 4B:
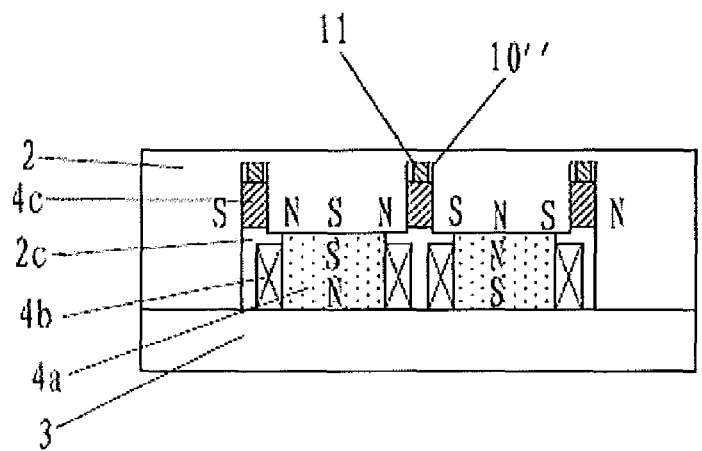
FIG. 4B: shows a cross section of the magnetic chuck according to FIG. 4A.
Figure 4C:
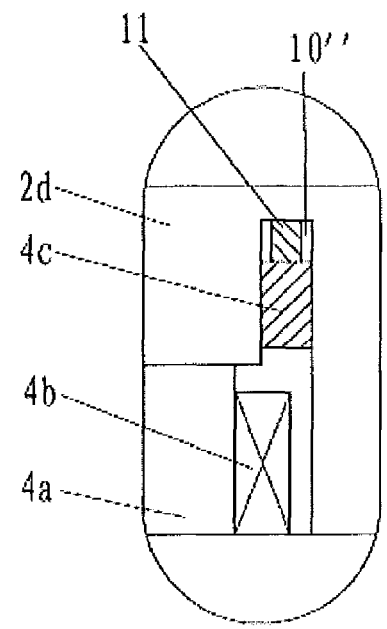
FIG. 4C: shows an enlarged detail of FIG. 4B.
Figure 4D:
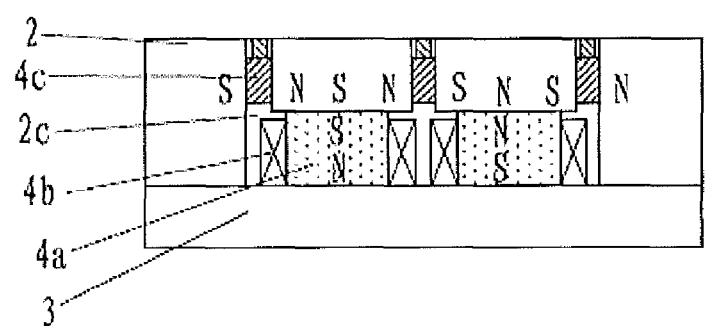
FIG. 4D: shows a cross section of the magnetic chuck depicted in FIG. 4A after the magnetic chuck depicted in FIG. 4A has undergone a number of grinding cycles.

In the embodiment shown in FIGS. 3A-D, also a portion 10' of the cavity 2c between the permanent magnets 4c and the closed end of the cavity is filled with non-magnetic-conductive material, in particular epoxy resin. However, the width of the cavity 2c is not reduced in the portion 10' according to the embodiment of FIGS. 3A-D. In order to produce this kind of magnetic chuck, therefore, before introducing the permanent magnets 4c into the cavity 2c, a first layer of non-magnetic-conductive material is inserted into the portion 10' of the cavity 2c. In particular, if epoxy resin is used as non-magnetic-conductive material, a first layer of epoxy resin is introduced into portion 10' of cavity 2c and cured. After that, the permanent magnets 4c are introduced into the cavity 2c. By filling portion 10' of the cavity 2c between the permanent magnets 4c and the closed end of the cavity before the permanent magnets 4c are introduced into the cavity 2c, it can be prevented that permanent magnets 4c protrude all the way to the closed end of the cavity 2c. As can be seen in FIG. 3D, also in this embodiment the permanent magnets 4c are protected by the portion 10' filled with non-magnetic-conductive material even after the material of the upper base between the top surface 2a and the formerly closed end of the cavity has been removed in a number of grinding circles.

In the embodiment shown in FIGS. 4A-D, spacers 11 are provided in the portion 10" of the cavity 2c between the permanent magnets 4c and the closed end of the cavity. The cavity 2c, similar to the embodiment shown in FIGS. 3A-D, is not reduced in width in a portion 10". However, instead of filling a first layer of epoxy resin into the portion of the cavity between the permanent magnets and the closed end of the cavity, as in the embodiment shown in FIGS. 3A-D, in the embodiment shown in FIGS. 4A-D, spacers 11 are introduced into the portion 10" of the cavity 2c before the permanent magnets 4c are introduced into the cavity. In this way, the spacers 11 prevent the permanent magnets 4c from protruding all the way to the closed end of the cavity 2c. After the elements of the magnetic chuck have been assembled, the remaining parts of the cavity 2c and also the remaining parts of the portion 10" of the cavity that are not filled up by the spacers 11, can be filled up with non-magnetic-conductive material. It is particularly preferred that the spacers 11 are made of the same non-magnetic-conductive material which is eventually used to fill up the remaining parts of the cavity 2c. In particular, the spacers 11 are made of pre-cured epoxy resin of the same kind of resin that is used for filling up the remaining parts of the cavity 2c. The embodiment shown in FIGS. 4A-D has the advantage over the embodiment shown in FIGS. 3A-D, that the spacers 11 can be produced in advance and the permanent magnets 4c can be introduced into the cavities directly after the spacers 11 have been positioned and the time for curing a first layer of epoxy resin introduced into the portion of the cavity between the permanent magnets 4c and the closed end of the cavity can be saved in this embodiment.

As can be seen in FIG. 4D, again the permanent magnets 4c are protected by the spacers 11 and the portion 10" filled with non-magnetic-conductive material even after the material of the upper base 2 between the top surface 2a and the formerly closed end of the cavity 2c has been destroyed during a number of grinding cycles.

In this way, the lifetime of magnetic chucks can be significantly prolonged, since even after the material of the upper base 2 between the top surface 2a and the formerly closed end of the cavity 2c is gone, the permanent magnets 4c are still protected and a further significant number of grinding cycles can be applied to the top surface 2a until finally also the portion 10, 10', 10" between the formerly closed end of the cavity and the permanent magnets will be gone and the permanent magnets 4c will emerge at the top surface.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A magnetic chuck, comprising:
   an upper base made of a single piece of magnetic-conductive material and having a top surface, sidewalls extending orthogonally from the top surface, a cavity formed within the upper base with an open end opposite to the top surface and an opposite closed end directed toward the top surface, and a plurality of cores extending orthogonally from the top surface and into the cavity;
   a lower base;
   a plurality of permanent magnets arranged within the cavity;
   a reversible magnet arranged between each of the cores and the lower base; and
   an excitation coil arranged around the circumference of each reversible magnet;
   wherein a portion of the cavity between the permanent magnets and the closed end of the cavity is filled with a non-magnetic-conductive material and the portion of the cavity between the permanent magnets and the closed end of the cavity has an extension in a direction parallel to the top surface that is smaller than the extension of the permanent magnets in the same direction.

2. The magnetic chuck according to claim 1, wherein an extension of the upper base between the top surface and the closed end of the cavity in a direction orthogonal to the top surface is between 0.1 mm and 5 mm.

3. The magnetic chuck according claim 2, wherein the extension of the upper base between the top surface and the closed end of the cavity in a direction orthogonal to the top surface is between 3 mm and 4 mm.

4. The magnetic chuck according to claim 2, wherein the extension of the upper base between the top surface and the closed end of the cavity in a direction orthogonal to the top surface is between 1 mm and 2 mm.

5. The magnetic chuck according to claim 1, wherein the portion of the cavity between the permanent magnets and the closed end of the cavity has an extension in a direction orthogonal to the top surface of about 5-10 mm.

6. The magnetic chuck according to claim 5, wherein the portion of the cavity between the permanent magnets and the closed end of the cavity has an extension in a direction orthogonal to the top surface of about 6 mm.

7. The magnetic chuck according to claim 1, wherein the extension of the closed end of the cavity in the direction parallel to the top surface is less than 50% smaller than extension of the permanent magnets in the same direction.

8. The magnetic chuck according to claim 1, wherein a spacer comprising a non-magnetic-conductive material is arranged within the portion of the cavity between the permanent magnets and the closed end of the cavity.

9. The magnetic chuck according to claim 8, wherein the spacer is made of pre-cured epoxy resin.

10. The magnetic chuck according to claim 8, wherein the spacer has an extension in a direction orthogonal to the top surface of 5-10 mm.

11. The magnetic chuck according to claim 10, wherein the spacer has an extension in a direction orthogonal to the top surface of about 6 mm.

12. A magnetic chuck with a spacer comprising a non-magnetic-conductive material being arranged within the portion of the cavity between each permanent magnet and the closed end of the cavity, the magnetic chuck being produced according to the method of claim 11.

13. A method for producing a magnetic chuck, the method comprising the steps of:
providing a single piece of magnetic-conductive material having an upper base with a top surface;
forming a cavity with an open end opposite to the top surface and an opposite closed end directed toward the top surface into the upper base such that from a top surface, sidewalls extend orthogonally from the top surface, and a plurality of cores extend orthogonally from the top surface and into the cavity;
arranging a plurality of permanent magnets in the cavity to form a portion in the cavity between the permanent magnets and the closed end of the cavity;
arranging a reversible magnet between each of the cores and a lower base;
arranging an excitation coil around the circumference of each reversible magnet;
filling the portion of the cavity between the permanent magnets and the closed end of the cavity with a non-magnetic-conductive material; and
filling a remaining volume of the cavity with non-magnetic-conductive material,
wherein the portion of the cavity between the permanent magnets and the closed end of the cavity is filled with non-magnetic-conductive material before the permanent magnets are placed into the cavity.

14. A method for producing a magnetic chuck, the method comprising the steps of: providing a single piece of magnetic-conductive material having an upper base with a top surface; forming a cavity with an open end opposite to the top surface and an opposite closed end directed toward the top surface into the upper base such that from a top surface, sidewalls extend orthogonally from the top surface, and a plurality of cores extend orthogonally from the top surface and into the cavity; arranging a plurality of permanent magnets in the cavity to form a portion in the cavity between the permanent magnets and the closed end of the cavity; arranging a reversible magnet between each of the cores and a lower base; arranging an excitation coil around the circumference of each reversible magnet; filling the portion of the cavity between the permanent magnets and the closed end of the cavity with a non-magnetic-conductive material; and filling a remaining volume of the cavity with non-magnetic-conductive material, wherein the cavity is formed such that the portion of the cavity between the permanent magnets and the closed end of the cavity has an extension in a direction parallel to the top surface that is smaller than the extension of the permanent magnets in the same direction.

15. A magnetic chuck with a spacer comprising a non-magnetic-conductive material being arranged within the portion of the cavity between each permanent magnet and the closed end of the cavity, the magnetic chuck being produced according to the method of claim 14.

16. A method for producing a magnetic chuck, the method comprising the steps of: providing a single piece of magnetic-conductive material having an upper base with a top surface; forming a cavity with an open end opposite to the top surface and an opposite closed end directed toward the top surface into the upper base such that from a top surface, sidewalls extend orthogonally from the top surface, and a plurality of cores extend orthogonally from the top surface and into the cavity; arranging a plurality of permanent magnets in the cavity to form a portion in the cavity between the permanent magnets and the closed end of the cavity; arranging a reversible magnet between each of the cores and a lower base; arranging an excitation coil around the circumference of each reversible magnet; filling the portion of the cavity between the permanent magnets and the closed end of the cavity with a non-magnetic-conductive material; and filling a remaining volume of the cavity with non-magnetic-conductive material, wherein a spacer comprising a non-magnetic-conductive material is arranged within the portion of the cavity between the permanent magnets and the closed end of the cavity before the permanent magnets are placed into the cavity.

17. A magnetic chuck, comprising an upper base made of a single piece of magnetic-conductive material and having a top surface, sidewalls extending orthogonal from the top surface, a cavity formed within the upper base with an open end opposite to the top surface and an opposite closed end directed toward the top surface, and a plurality of cores extending orthogonal from the top surface and into the cavity, wherein a plurality of permanent magnets is arranged in the cavity and a reversible magnet is arranged between each of the cores and a lower base, an excitation coil is arranged around the circumference of each reversible magnet, a portion of the cavity between the permanent magnets and the closed end of the cavity is filled with a non-magnetic-conductive material, and a spacer comprising a non-magnetic-conductive material is arranged within the portion of the cavity between each permanent magnet and the closed end of the cavity, wherein the spacer is made of plastic.

* * * * *